N. A. LYBECK.
SUBMARINE CULTIVATOR AND HARVESTER.
APPLICATION FILED JAN. 6, 1911.

1,079,182.

Patented Nov. 18, 1913.
14 SHEETS—SHEET 1.

WITNESSES

INVENTOR
Nels A. Lybeck
BY
ATTORNEYS

N. A. LYBECK.
SUBMARINE CULTIVATOR AND HARVESTER.
APPLICATION FILED JAN. 6, 1911.

1,079,182.

Patented Nov. 18, 1913
14 SHEETS—SHEET 6

WITNESSES

INVENTOR
Nels A. Lybeck
BY
ATTORNEYS

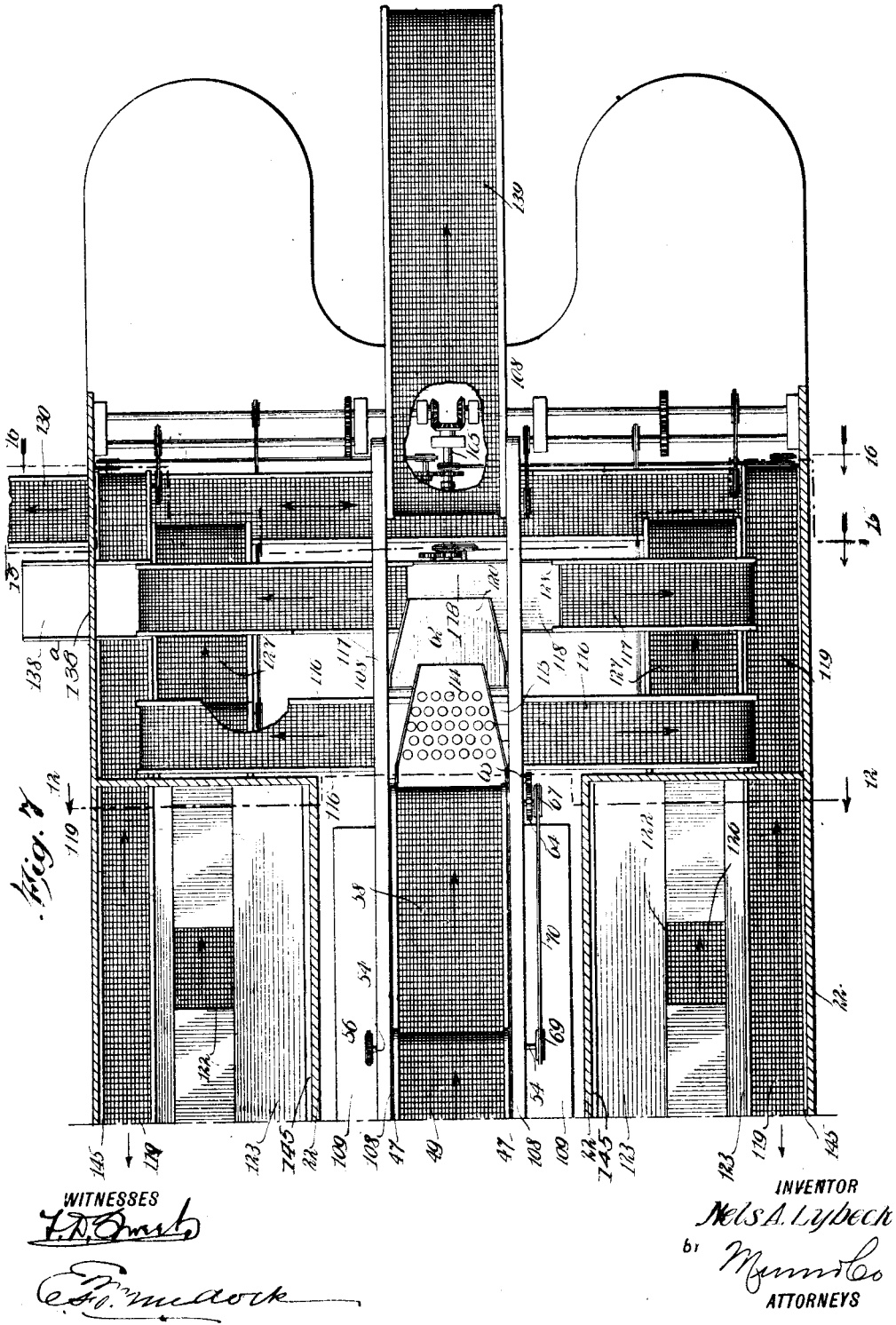

N. A. LYBECK.
SUBMARINE CULTIVATOR AND HARVESTER.
APPLICATION FILED JAN. 6, 1911.
1,079,182.
Patented Nov. 18, 1913.
14 SHEETS—SHEET 8.
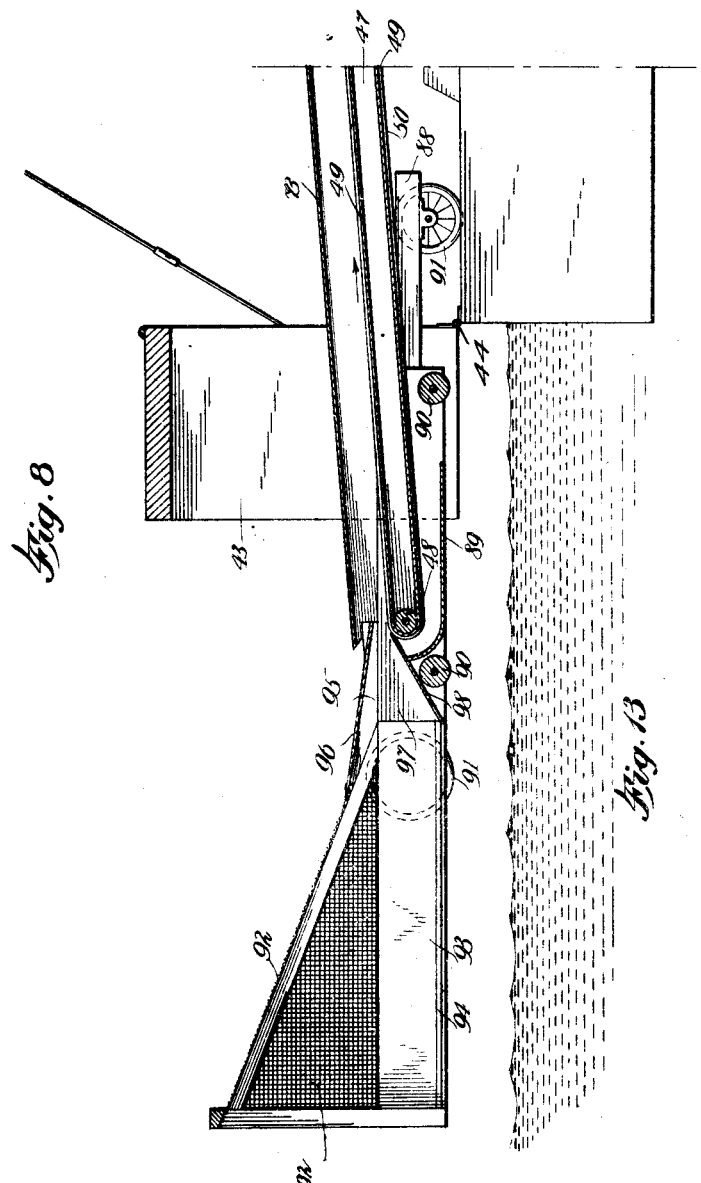
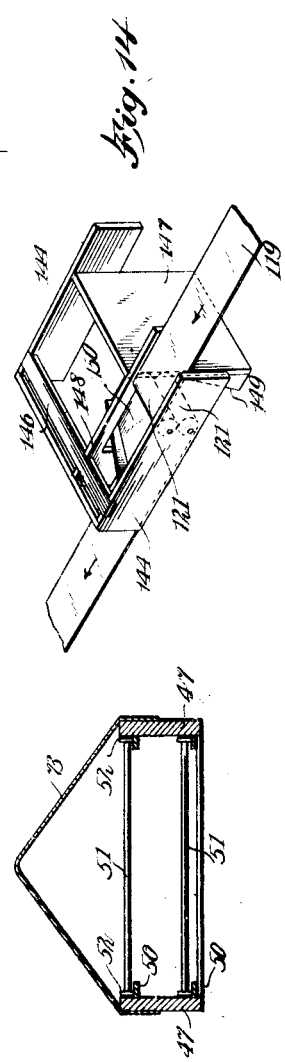
WITNESSES
INVENTOR
Nels A. Lybeck
BY
ATTORNEYS

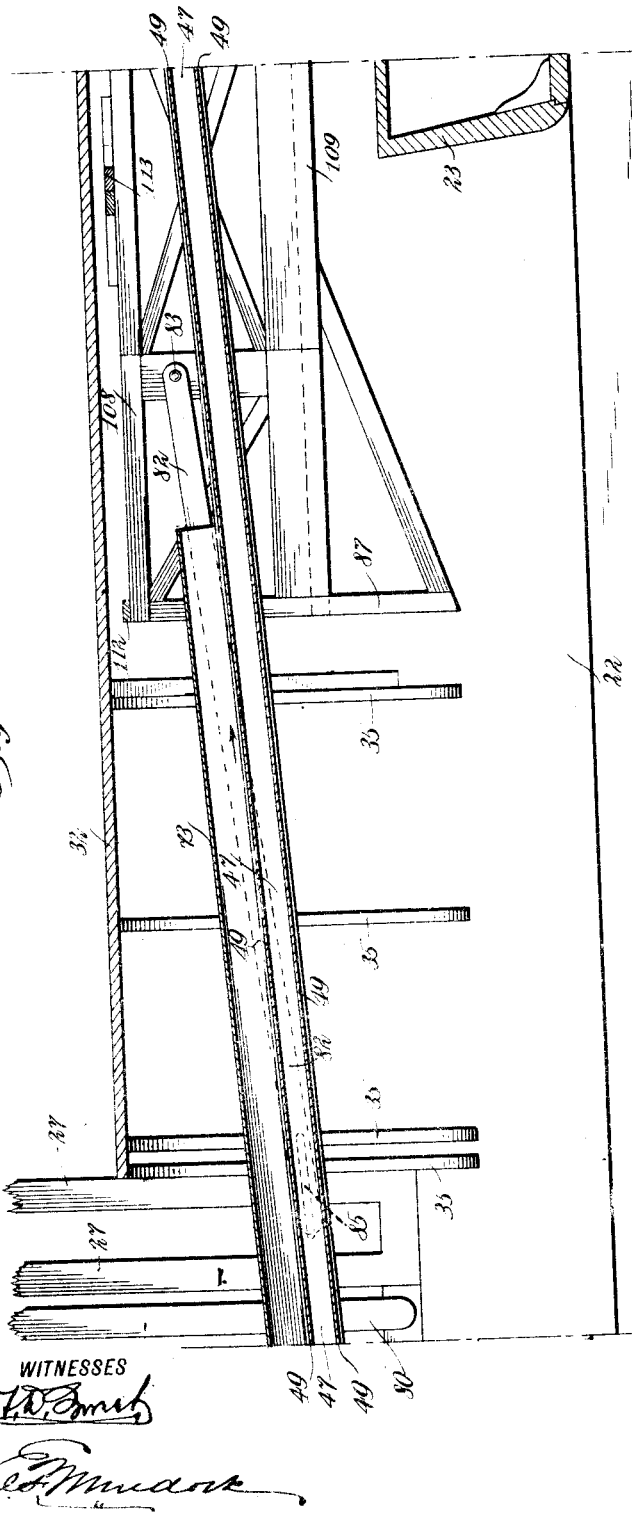

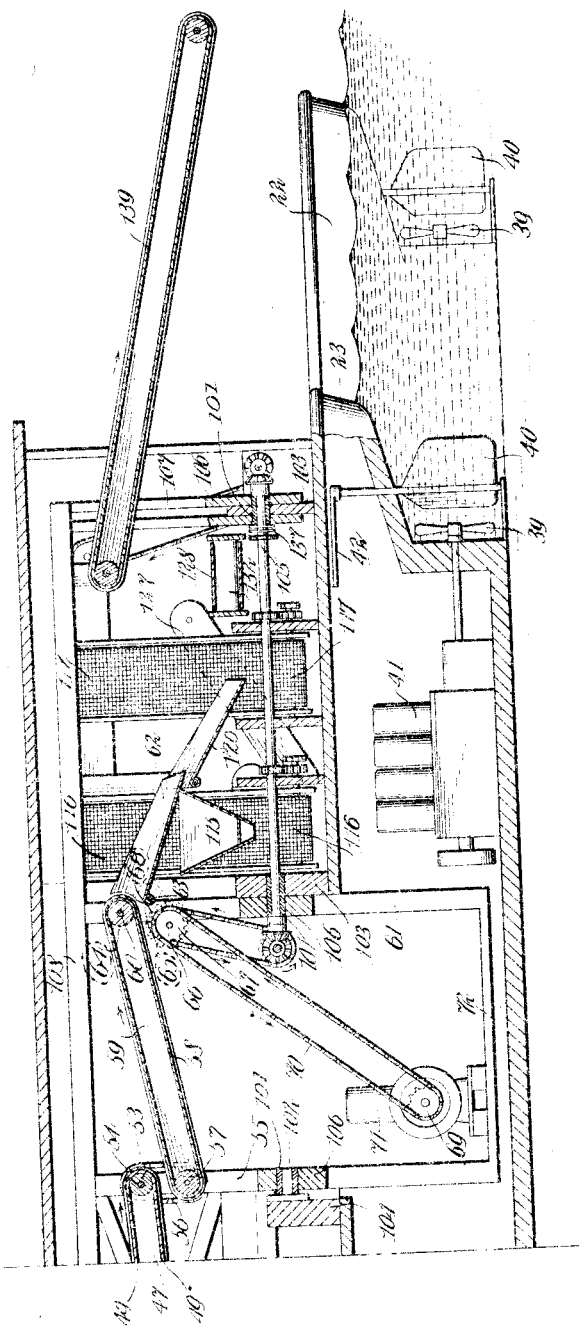

N. A. LYBECK.
SUBMARINE CULTIVATOR AND HARVESTER.
APPLICATION FILED JAN. 6, 1911.
1,079,182.
Patented Nov. 18, 1913.
14 SHEETS—SHEET 11.
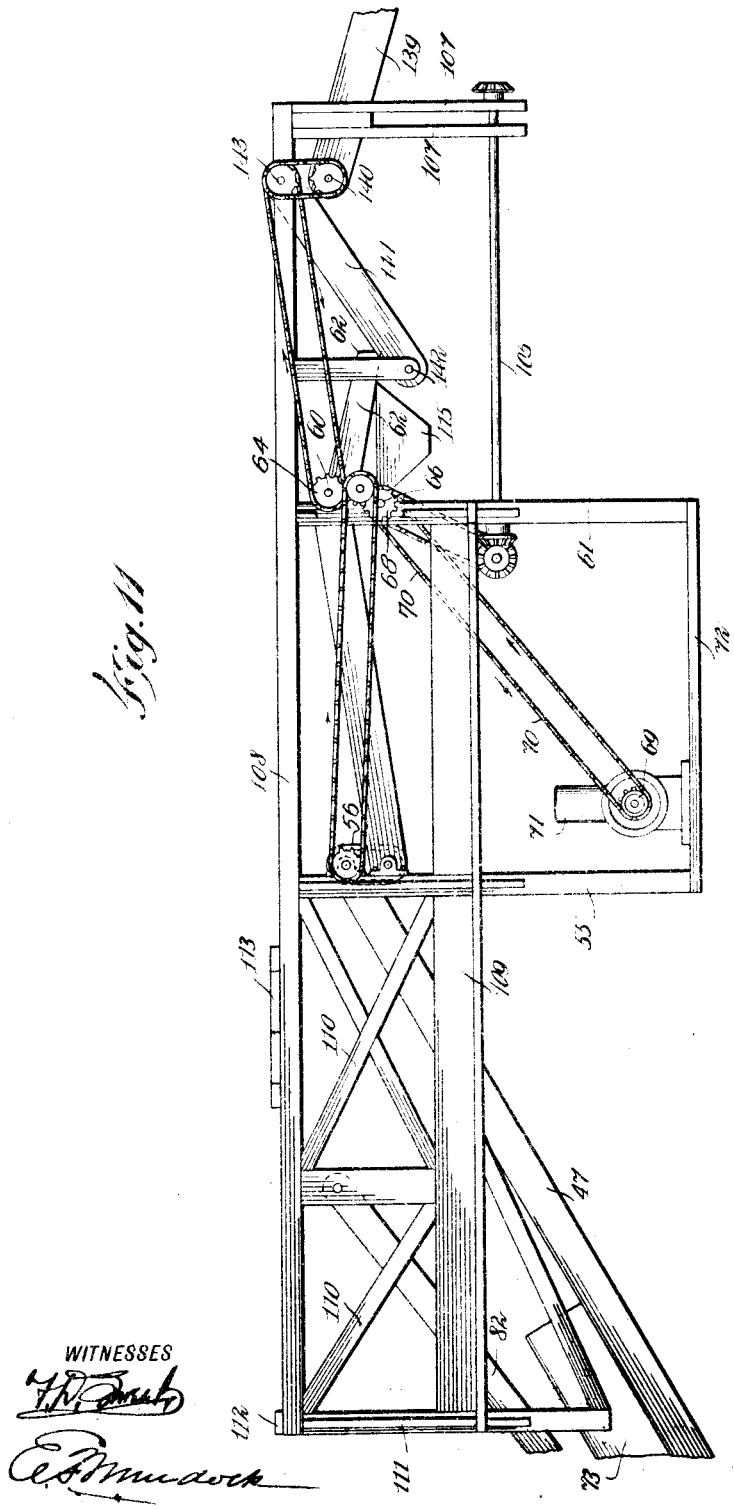
WITNESSES
INVENTOR
Nels H. Lybeck
BY
ATTORNEYS N. A. LYBECK.
SUBMARINE CULTIVATOR AND HARVESTER.
APPLICATION FILED JAN. 6, 1911.

1,079,182.

Patented Nov. 18, 1913.
14 SHEETS—SHEET 12.

WITNESSES

INVENTOR
Nels A. Lybeck
BY
Munn & Co
ATTORNEYS

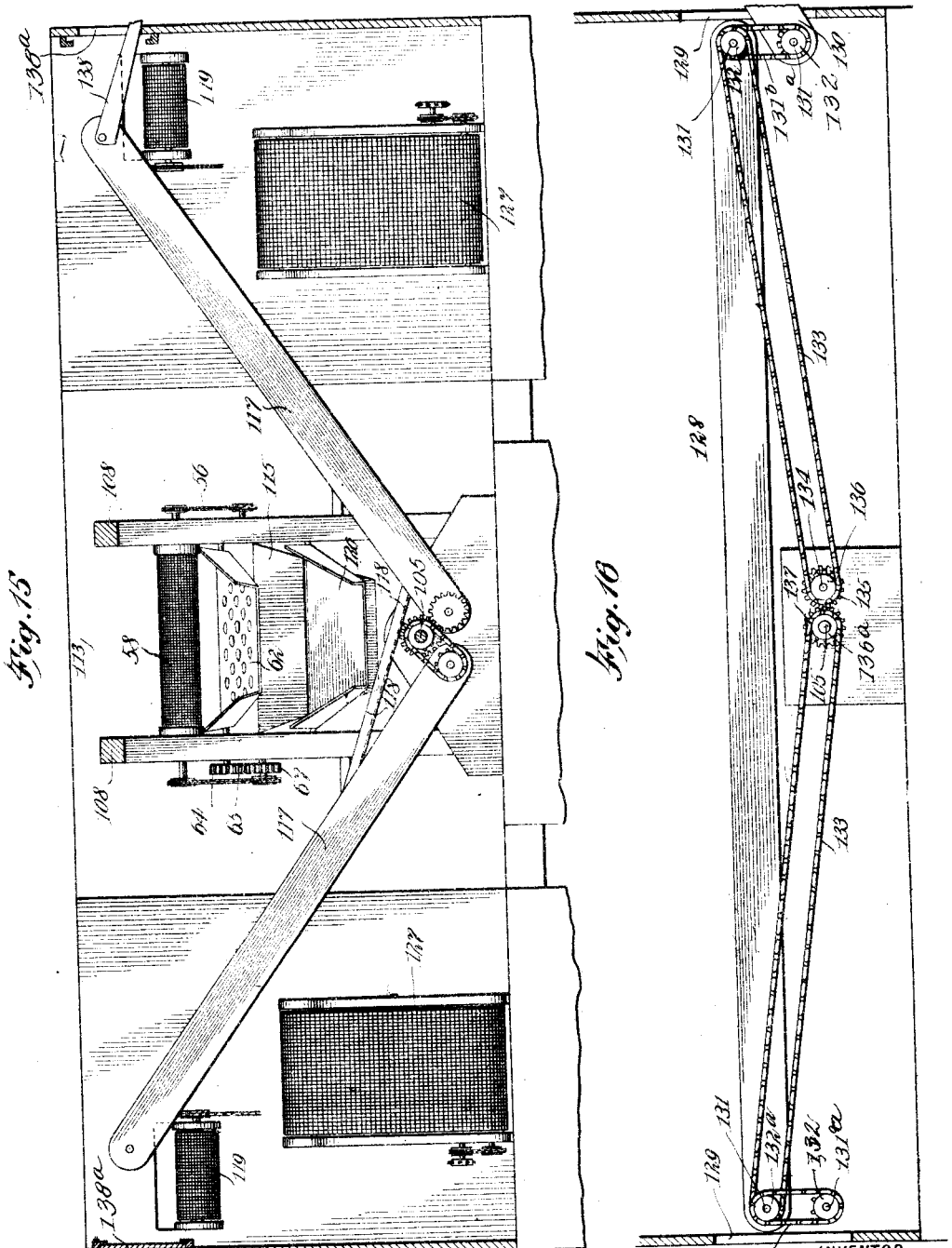

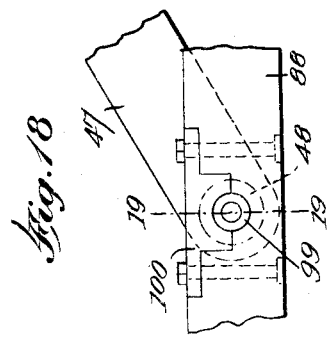
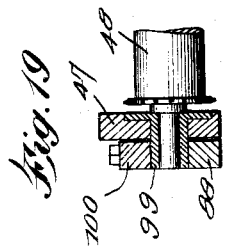
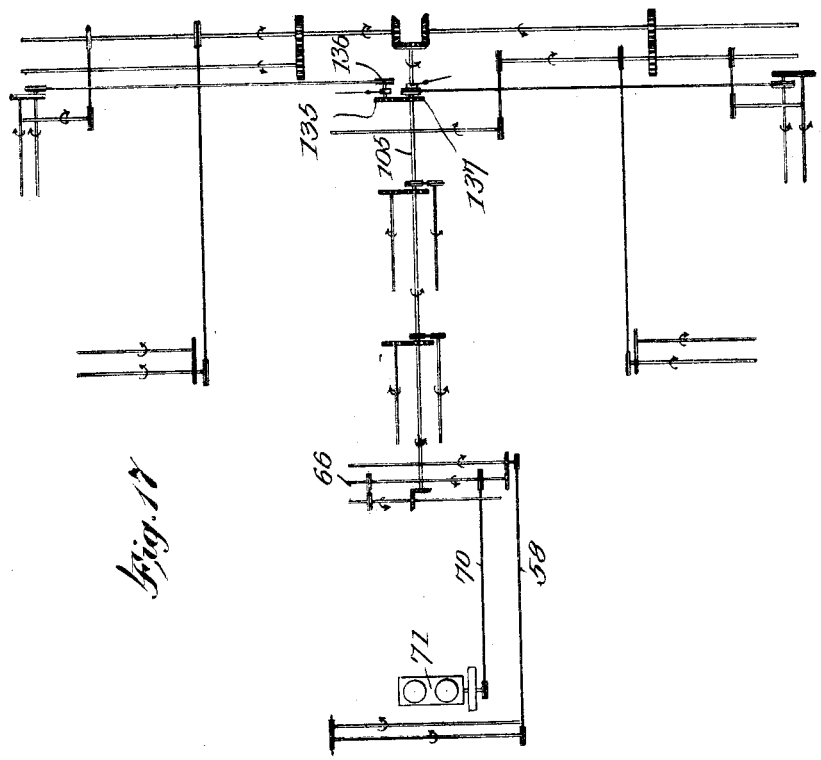

UNITED STATES PATENT OFFICE.

NELS A. LYBECK, OF BRISTOL, RHODE ISLAND.

SUBMARINE CULTIVATOR AND HARVESTER.

1,079,182.  Specification of Letters Patent.  Patented Nov. 18, 1913.

Application filed January 6, 1911. Serial No. 601,562.

*To all whom it may concern:*

Be it known that I, NELS A. LYBECK, a citizen of the United States, and a resident of Bristol, in the county of Bristol and State of Rhode Island, have invented a new and Improved Submarine Cultivator and Harvester, of which the following is a full, clear, and exact description.

Among the principal objects which the present invention has in view are: to provide a machine which may be employed to cultivate and care for submarine fishery beds, and more particularly oyster beds, and to harvest the yield thereof; to construct and arrange a machine of the character mentioned which may be employed to gather, sort, distribute and store the said yield; and to provide a supporting vessel and gathering mechanism so connected as to permit the roll of the vessel without changing the angle of operation of the gathering device.

With the above objects in view the invention consists primarily in forming a vessel having a submarine boom pivotally connected therewith, and controlling means for regulating the depth and submerged position of said boom.

It further consists in providing for operation in conjunction with the said boom, devices suitable for gathering or capturing the yield of submarine cultivated beds.

It further consists in providing a pivotal connection between the floating vessel and the submarine boom whereby the rocking and pitching of the vessel do not affect the working position of the tools attached to the submerged end of the said boom.

One embodiment of the present invention is disclosed in the structure illustrated in the accompanying drawings in which like characters of reference denote corresponding parts in all the views, and in which—

Figure 1:
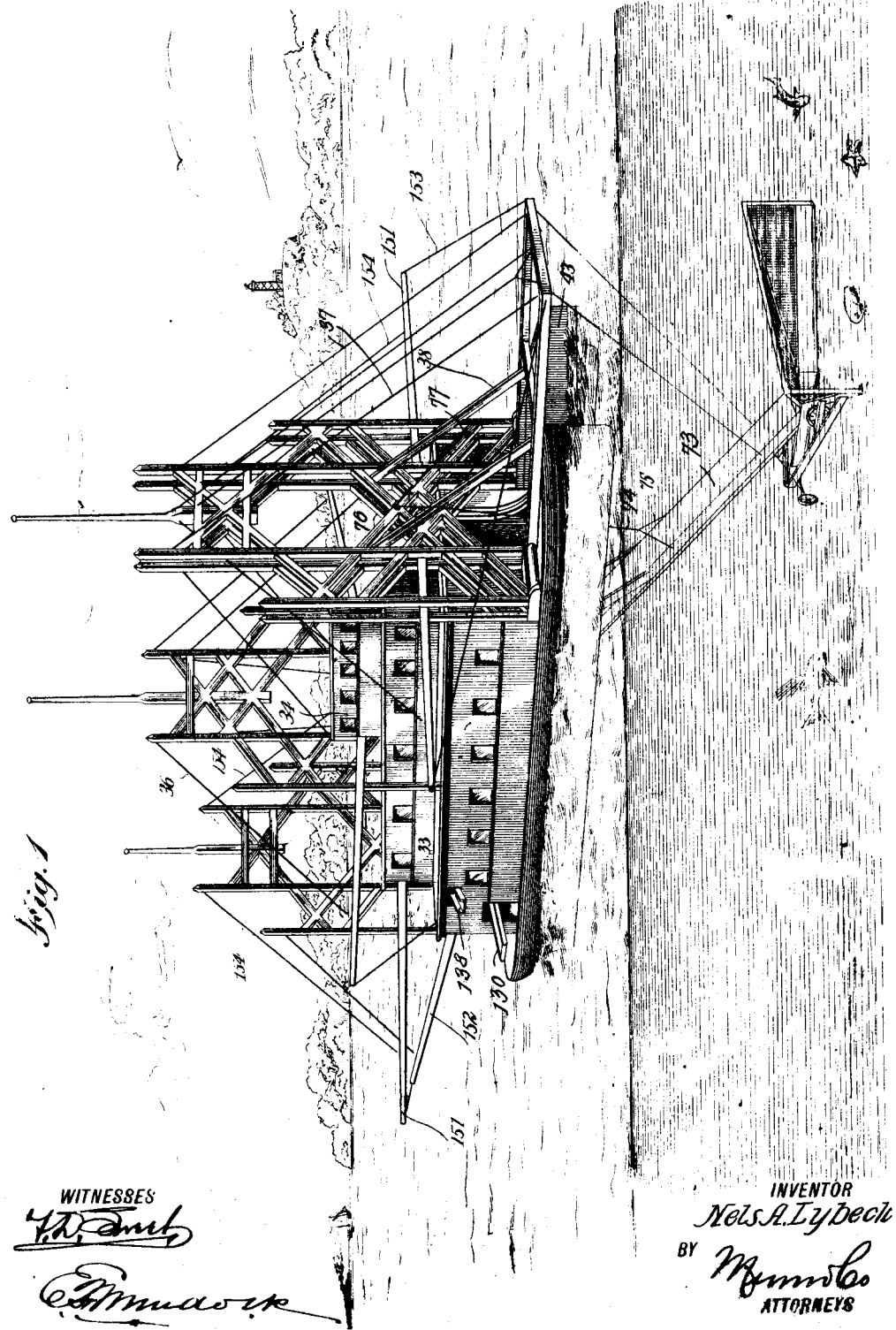
Figure 2:
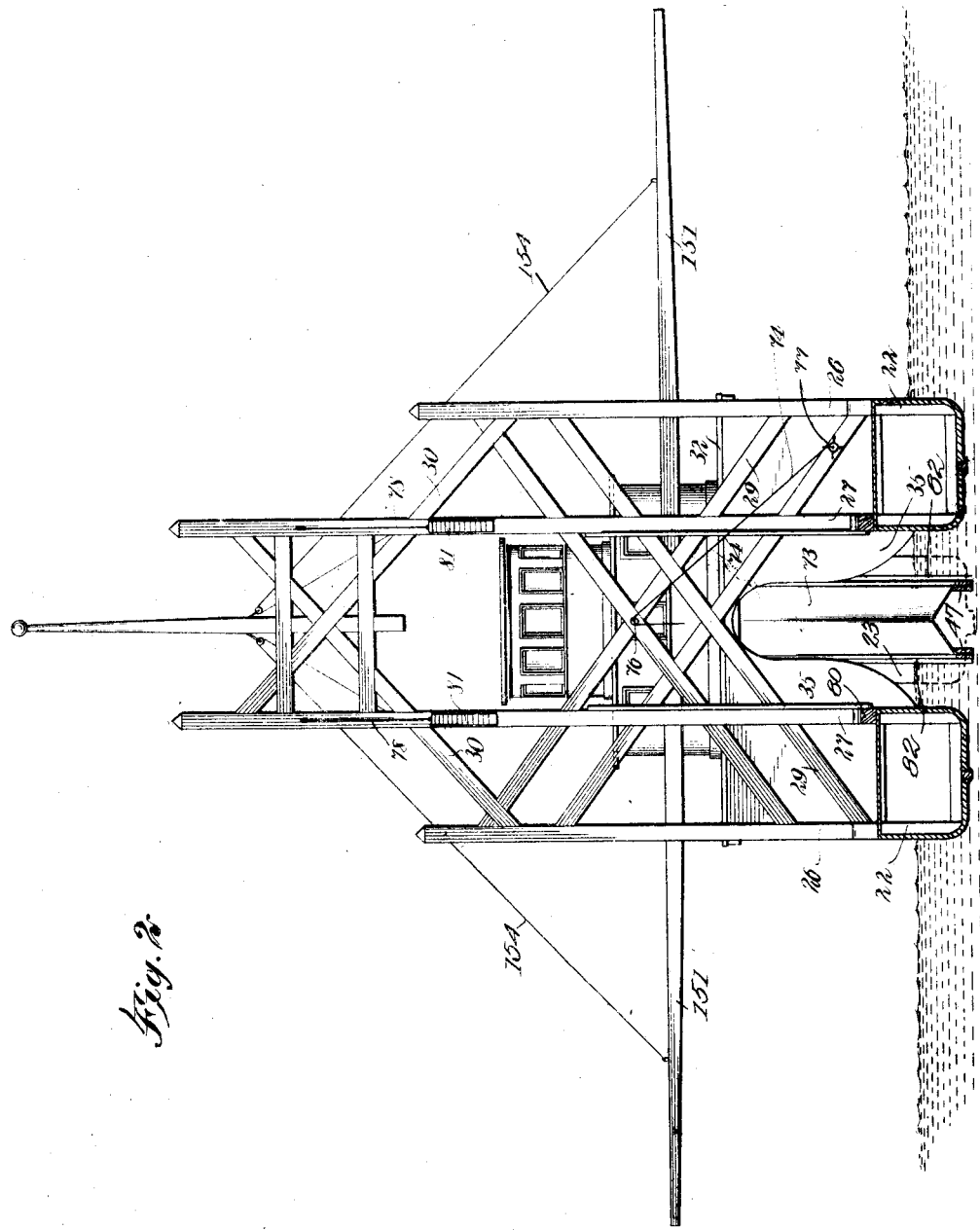
Figure 3:
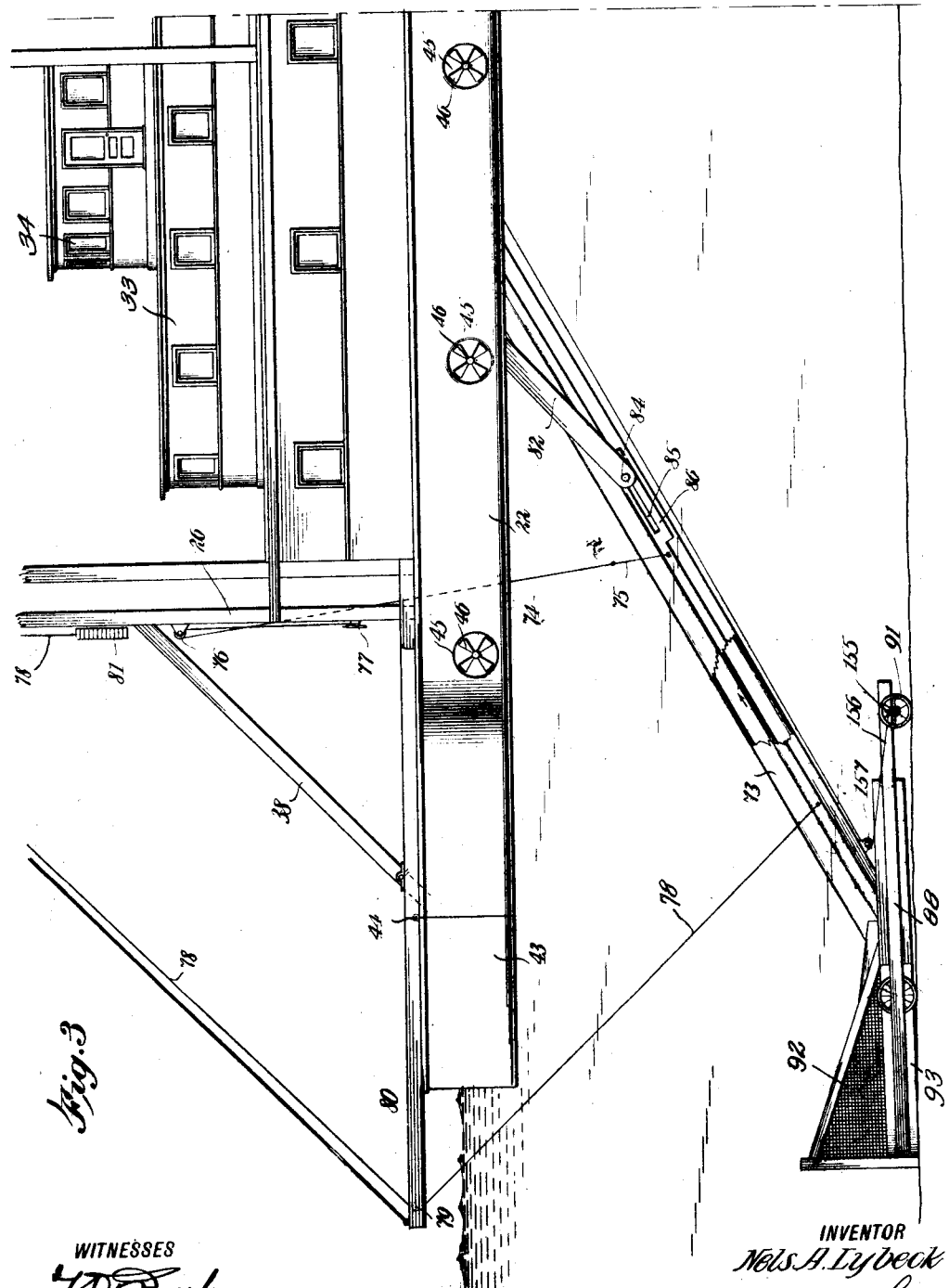
Figure 4:
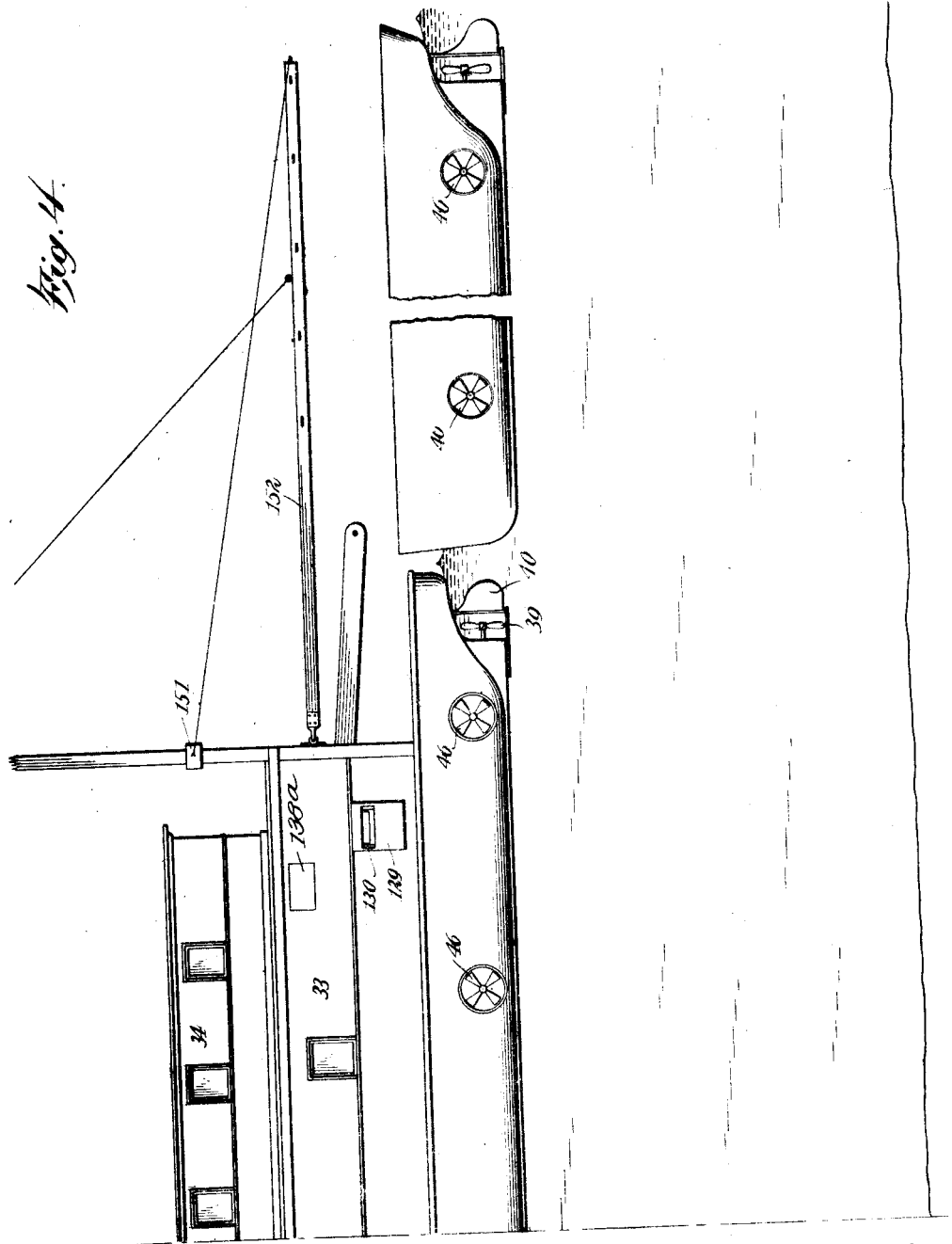
Figure 5:
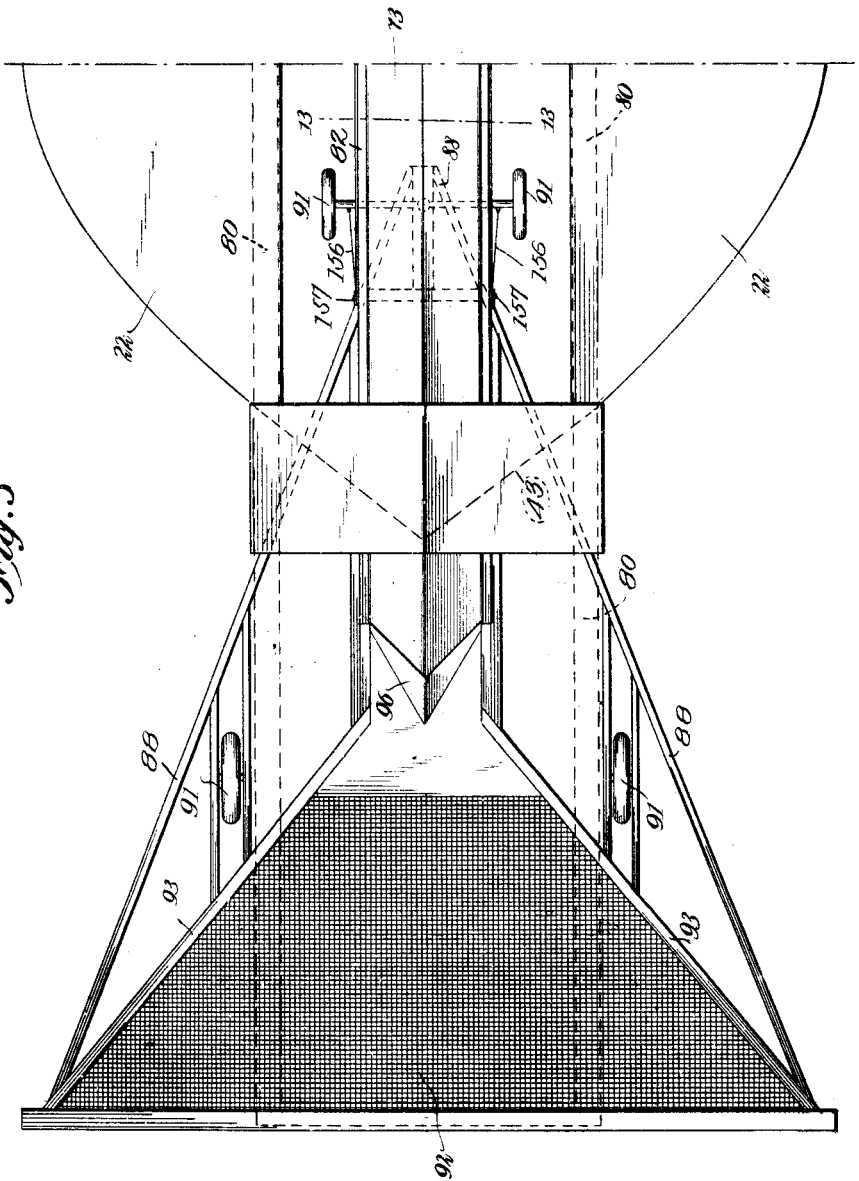
Figure 6:
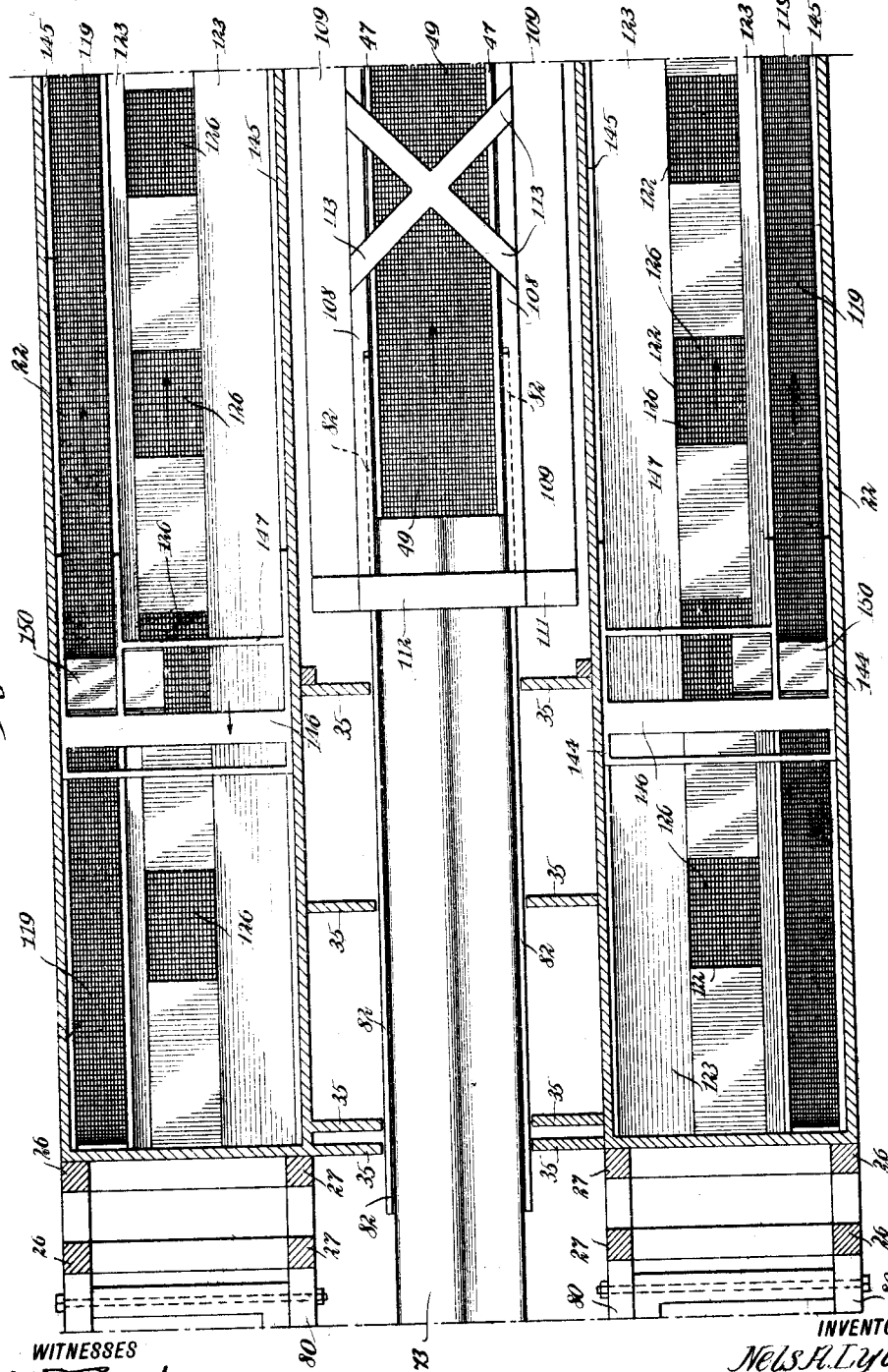
Figure 12:
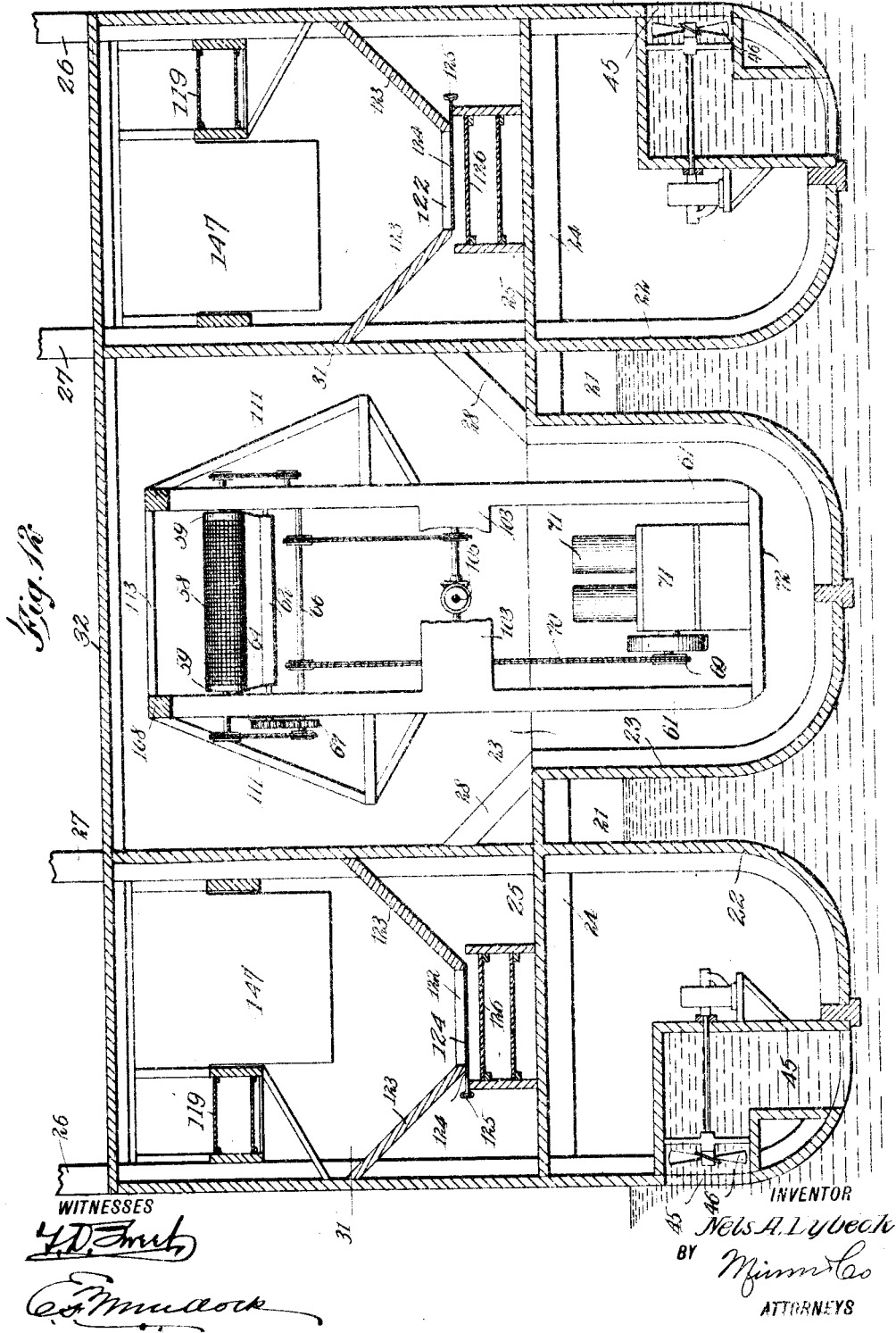

Figure 1 is a pictorial prospective view of a vessel constructed and arranged in accordance with the present invention, the conveyer, boom and harvesting creel connected therewith being shown in light shaded lines as below the surrounding water; Fig. 2 is a vertical cross section of the hull of the vessel, the section being taken across the bows thereof; Figs. 3 and 4 are matched views, showing in side elevation a machine constructed and arranged in accordance with the present invention, the truss structures being cut away and the tender being shown as separated and contracted; Figs. 5, 6 and 7 are matched views in plan of the deck house, the superstructure being removed to show the loading bins, distributing conveyers and operating mechanism therefor; Figs. 8, 9 and 10 are matched views, showing in vertical section the elevator and cradle therefor, the section being taken on the median line of Figs. 5, 6 and 7; Fig. 11 is a detail view in side elevation, of the cradle for supporting the elevator; Fig. 12 is a cross section of the vessel, taken on the line 12—12 in Fig. 7; Fig. 13 is a vertical cross section of the elevator boom, taken on the line 13—13 in Fig. 5; Fig. 14 is a detail view, in perspective, of the loader; Fig. 15 is a vertical cross section of the superstructure, taken on the line 15—15 in Fig. 7; Fig. 16 is a vertical cross section of the superstructure, taken on the line 16—16 in Fig. 7; Fig. 17 is a diagrammatic view, showing the layout arrangement of the shafting and transmission mechanism connecting the same for driving the various conveyer belts; for purpose of illustration and to avoid confusion in this figure the shafts directly superposed are disposed in staggered relation; Fig. 18 is a detail view, showing in side elevation, fragments of the load end of the boom and the fishing scoop connected therewith; and Fig. 19 is a vertical section taken on the line 19—19 in Fig. 18.

In a former application for patent upon an invention in oyster dredging and manipulating machines, which application was filed by me December 24, 1909, and bears Serial No. 534,752, is shown and described a machine for preparing and cultivating oyster beds, and for gathering, manipulating and delivering the oysters grown thereon. The present invention is more particularly a development of the machine therein shown. For the purpose of clearness of description the various elements of the present invention will be, as far as possible, separately pointed out and under distinctive headings.

*The vessel.*—As illustrated in the drawings, the vessel is provided with three hulls, transversely separated to form passages 21, 21 therebetween. The hulls 22, 22 have a total overall length, while the central hull 23 is equal to about one-third of the length of each of the hulls 22. The central hull 23 and the two lateral hulls 22, 22 are connected by transverse deck beams 24, 24 and a deck floor 25, 25. Incorporated in the outer wall structure of each of the hulls 22 are vertical struts 26, 26 and 27, 27. The struts 27, 27 are connected with the deck framing of the hull 23 by means of knee braces 28, 28. Truss braces 29, 29 and 30, 30 are rigidly attached to each of the struts 26—27, and crossed upon themselves in the most approved manner of framing truss metal structures, substantially as shown in Figs. 1 and 2 of the drawings, uniting rigidly in operative position the hulls 22, 22. The said braces, in conjunction with the braces 28, 28, form a floating structure having three parallel hulls. The floors 25, 25 form decks in each of the hulls, above which and between the struts 26—27 are erected the bins 31, 31. The bins 31, 31 are formed of any suitable depth or height, and are covered by a deck 32. The deck 32 extends across the triple hull bridging the channel between the hulls 22, 22 forward of the hull 23. It is upon the deck 32 and above the same that the living cabin 33 and the pilot house 34 are erected. Suitable gang-ways are supplied, though not shown in the accompanying drawings, for communication between the various decks and holds of the hulls 22, 22 and 23.

In the channel between the hulls 22, 22, forward of the hull 23, there are provided the knees 35, 35, which are rigidly connected to the sides of the hulls 22, 22 and to the inner walls of the decks, also, where convenient, to the struts 27, 27 and the deck 32. The knees 35, 35 are sufficient in number to form a rigid structure of the character described and shown. Each of the knees is provided with a vertical straight section which constitutes a guide and a lock for the boom hereinafter described when the same is lifted from the water in inoperative and carried position.

As shown in the drawings, the trussed struts and framings therefor constituted are three in number. The frames are interbraced by suitable guys 36, 36 forming thereby an elastic, vibrant but strong structure. The end frames are outwardly braced by guys 37, 37 and by stiff legs 38, 38, which are rigidly connected with the hulls 22, 22 at the bow thereof.

At the bow end of the hulls 22, 22 the truss frame is double to serve the dual purpose of reinforcing the structure at this point to receive the extra strain and to carry the extra weight of the submarine boom and swinging frame therefor; and the added purpose in that between the frames the forward tender booms are swung, and by reason of the arrangement, are placed in position to hold against a bow as well as a stern strain on the accompanying tender.

The vessel is normally propelled by a plurality of screw propellers 39, 39 and is guided by rudders 40, 40. The propellers 39, 39 are each driven by any suitable type of engine 41 disposed substantially as shown in Fig. 10 of the drawings. The rudders 40, 40 are steered by any suitable tackle operated from the pilot house 34, and connected with the tiller head 42 of each of the said rudders. While I have herein shown a plurality of rudders 40 it will be understood that I may steer the vessel by employing only one of the said rudders, to wit, the rudder mounted on the hull 23.

It is to prevent the admission of ice to the channel between the hulls 22, 22 that I have provided the wedge-shaped ice prow 43. The prow 43 is hingedly mounted at 44, 44 upon the bow of each of the hulls 22, and being suitably reinforced serves further to tie the hulls 22, 22 together. When the submarine boom is lifted from operative position it strikes under and raises the prow to the position shown best in Fig. 8 of the drawings.

To provide the vessel with means for preventing leeway during the operation occasioned by currents or wind pressures, and when it is desired to operate broadside to such current and wind pressures, there are provided two series of tubes 45, 45, which tubes are curved to open through the bottom of the hulls 22, 22 and through the outer side thereof. Suitably located within each of the tubes is a propeller 46, operatively connected with the driving shaft whereof is provided an electric or other suitable motor. The motors are preferably provided with mechanism for operating the same independently. Where electric motors are employed the wiring for the operative circuits thereof may be assembled on a switch board located in the pilot house 34 to be therefrom operated by the pilot. This independent handling of the propellers 46 enables the pilot to employ the said propellers as auxiliary steering devices. In their normal operation, however, they are employed to move the vessel to correct the drifting influences above mentioned.

*The boom.*—The boom is shown in the accompanying drawings as provided with two elongated rails 47, 47. The rails 47, 47 are properly braced to maintain their parallel relation and rigidity of form. Between the rails at the lower end is provided an idler roller 48 by which the conveyer belt 49 is guided. The belt 49 is supported on the rails 47, 47, inturned flanges 50, 50 being provided to receive and support the upper and lower extensions of the said belt. The belt 49 is preferably constructed of open meshed metallic structure, any suitable construction therefor being employed. At present I prefer to use a belt, wherein woven sections are connected to rods 51, 51 to be supported thereby, the rods 51 having rollers 52, 52 for reducing the friction on the flanges 50, 50. The conveyer belt 49 is supported at its upper or inner end upon a roller 53. The shaft 54 of the roller 53 constitutes the pivot for the swing of the conveyer rails 47. The shaft 54 is suitably mounted in bearings provided in stanchions 55, 55 of the cradle in which the boom is mounted. The roller 53 is driven by means of a short connecting belt 56, which serves to operatively connect the said roller 53 with a roller 57 upon which is supported a short section of endless conveyer belt 58. The conveyer belt 58 is mounted and guided between rails 59, 59, and supported at the upper or delivery end by a roller 60. The roller 60 is pivotally mounted between stanchions 61. The belt 49 and the belt 58 deliver the articles gathered from the submerged bed and deliver the same to a chute 62 pivotally mounted at 63 between the stanchions 61, 61. It is by means of the chute 62 that the material gathered is delivered to the conveyers and distributing mechanism hereinafter set forth.

The roller 60 is provided at one or both ends with a suitable gear wheel 64 which is held in toothed engagement with a gear wheel 65. The gear wheel 65 is a transmission gear serving to transmit the rotary motion from a shaft 66, a gear wheel 68 being provided on the said shaft for that purpose. The shaft 66 is provided with a sprocket wheel 67, which is directly connected with a driving sprocket wheel 69 by means of a sprocket chain 70. The sprocket wheel 69 is directly connected with an engine 71 mounted upon and supported by the floor 72 of the cradle.

The rails 47, 47 are reinforced and connected by a hood 73. The hood 73 is rigidly secured to the outer side of the rails 47, as shown best in Fig. 13 of the drawings, and is preferably constructed to an angular shape in cross section, the angle of the hood forming a cut-water to ease or relieve the pressure of the water on the boom as the vessel is propelled through the water.

The tool provided end of the boom is lifted by means of a cable 74, a bridle 75 being provided to straddle the said hood 73 for rigid attachment to the sides of the rails 47, 47. The cable 74 is reeved over a pulley 76, and is therefrom carried to a belaying block 77 mounted on the truss 29. The end of the cable 74 is made fast to the block 77 only when the boom is lifted. Under normal working conditions the boom is free to follow the contour of the bottom on which the tool, with which the said boom is provided is working.

To balance the boom against water pressure due to speed of the vessel, and also to prevent the drop thereof into a sudden depression in the bottom, thereby causing a whipping action in the boom and tool connected therewith, I have provided the cables 78, 78. The cables 78, 78 are reeved over pulleys 79, 79 in the outer end and at the extreme sides of the pivoted boom frame 80. The cables 78 are provided at the free ends with variable balancing weights 81, 81. The whights 81, 81 are variable, as stated, weight being added or deducted to modify the pull on the cables 78 proportioned to the speed of the vessel. It will be understood that as the speed of the vessel is increased the pressure on the forward surface of the hood 73 is proportionately increased. By arranging the cables 78, 78 in the manner described there is provided a yielding connection between the vessel and the boom which permits the roll or pitch of the vessel without serious disarrangement of the boom and tool connected therewith.

It is to steady the operation of the boom, and to brace the same against lateral pressure exerted at the forward ends, that I have provided the bars 82, 82. The bars 82, 82 are pivotally mounted at 83, 83 in the frame of the cradle in which the boom is supported, and are provided at the lower ends with pin studs 84, which are inserted in guided relation in slots 85. The slots 85 are formed in bracket plates 86 provided on opposite sides of the boom, as shown best in Figs. 3 of the drawings. The sliding engagement between the bars 82 and the boom compensates for the difference in the arcs of movement about the pivot of the boom and the pivot of the bars 82. The bars 82 preserve, at a distance from the pivot of the boom, a restraining pressure against the lateral displacement of the boom. The bars 82 are prevented from lateral movement by guide members 87 provided in the end of the cradle, as best seen in Fig. 9 of the drawings.

*The tools.*—A variety of tools may be used in conjunction with the boom herein shown and described. These tools are employed for leveling, plowing, weeding and otherwise preparing oyster beds. The tools are also used for removing from the oyster beds and from the oysters planted thereon the various predatory foes of the oyster, such as starfish and borers. Further, the character of tool shown in the accompanying drawings is employed for the capture of certain classes of shell fish, such as schrimps and crabs, as well as other classes of fish.

The tool employed in conjunction with the present machine illustrated in the accompanying drawings, is what is termed by me a fishing scoop. The scoop consists primarily of side rails 88. The rails 88 are connected by a sheet metal or other suitable sledge bottom 89, the forward edge whereof is upturned. Longitudinally disposed forward and aft of the said bottom 89 are rollers 90, 90. The rollers 90, 90 are projected slightly beyond the bottom 89. The side rails 88, 88 provide independent channels for carrying wheels 91, 91. The wheels 91, 91 are projected slightly below the rollers 90, 90 and are provided to normally support the body portion of the scoop. The scoop proper is formed of a frame which is flared forwardly and upwardly, as shown best in Figs. 5 and 8 of the drawings. The framing for the scoop is constructed of as light a material as is suitable to the work. The space between the structural framing members on the sides and top is covered by a suitable netting 92, allowing free passage therethrough of water, thus avoiding the pressure which an extended area such as is covered by the said sides and top would produce on the boom and conveyer connected therewith. The bottom side rails 93, 93 are disposed with reference to the bottom 89 to rest on the bottom of the oyster bed or close thereto. The rails 93 are provided at the bottom thereof with inturned flanges 94, the upwardly inclined sides whereof produce a slight lifting current whereby fish or other articles impounded within the compass of the scoop are maintained in the upper portion thereof until delivered to the throat passage 95 at the converged inner end of the said scoop. The passage 95 is formed by a funnel 96, side plates 97 and an inclined table 98, all of which are rigidly secured to the frame of the scoop substantially in the manner as shown in Fig. 8 of the drawings. The table 98 extends above the belt 49 and deposits on the said belt the captured fish, the water current imparted by the forward motion of the machine being employed for the delivery.

The scoop and framing therefor are secured to the rails 47, 47 of the boom, hollow gudgeons 99, 99 being provided in the said rails. Within the gudgeons 99, 99 is mounted the shaft of the roller 48 whereon is supported the belt 49. Suitable parting boxes are provided in the rails 88, 88, the upper section whereof is removable to admit of depositing within the lower section the said gudgeons 99. This construction is best seen in Figs. 18 and 19. The upper section 100 is removable, as stated, and is held permanent when set by means of lag or stay bolts. As a result of the employment of this construction the pushing strain of the rails 47, 47 on the scoop is removed from the shaft of the roller 48, the belt 49 moving freely on the said roller irrespective of the pressure on the scoop or other tool with which the boom is provided.

The object in the arrangement of the wheels 91, 91, rollers 90, 90 and the bottom 89 is to provide for the irregularity in the form of the bottom of the sea. The bottom of the sea being irregular the wheels 91, 91 would at times drop into hollows, and if the scoop depended solely upon the said wheels the rise and fall of the rails 47, 47 would be vibratory. When constructed as shown in the drawings, however, the rollers 90, 90 replace the wheels 91, 91, and if the ridge or rock over which the tool is passing be sharp, and the rollers 90, 90 lose their footing, then the bottom 89 strikes and slides over the said ridge or rock. Further, in the same connection, it is provided that where the sea bottom is unsubstantial, and where the wheels 91, 91 and the rollers 90, 90 would not support the scoop sufficiently above the bottom for the best employment thereof, the bottom 89 forms a toboggan-like support for the scoop whereby the said scoop is constantly held in operative position irrespective of the peculiarities of condition of the bottom over which the tool is working.

*The cradle.*—An essential feature in the proper operation of a machine of the character described is that the vessel is permitted to pitch and roll on the surface of the sea without disturbing the operative position of the tool attached to the boom with which the machine is provided. In the present instance the cradle performs this function, and also provides for the support and operation of the driving and transmission mechanism employed for the operation of the conveyer belt and attachments thereto mounted on the said boom.

The cradle is best seen in Fig. 11 of the drawings. The frame shown in the said figure is pivoted on hollow boxes 101, 101 and upon the pivot 102. The boxes 101, 101 are fixedly mounted in structural framing headers 103, 103, and the pivot 102 is extended from the side of the structural framing header 104, the center of the pivot 102 being alined with the center of the boxes 101 and with the transmission shaft 105 mounted in the said boxes. The boxes 101 are extended through the framing beams 106, 106 extended between the stanchions 55, 55—61, 61 and the stringers 107. On the said stanchions 55, 61 and stringers 107 are supported framing strings 108, 108 and side bars 109, 109. Forward of the engine room formed by the floor 72 and the stanchions 55, 61, the strings 108 and the bars 109 are cross braced vertically and transversely by braces 110, arranged as shown, or in any other suitable manner. At the outer and forward end of the cradle frame there is provided a vertical guide rail 111, against the inner side whereof the bars 82, 82 bear. The sides of the extended frame are prevented from spreading by a cross header bar 112 and the tie bars 113. The frame is further reinforced to resist longitudinally applied strains by the lateral extension of the side bars 109, 109, as shown best in Fig. 6 of the drawings.

The floor 72 and the engine 71 resting thereon are disposed below the pivotal center of the cradle, the stanchions 55, 61 being extended to provide for this form of structure. The engine 71 is of sufficient weight to maintain the vertical disposition of the cradle. Should, however, experience prove that the engine is not sufficiently heavy, the weight thereof may be augmented by any suitable means. The purpose of the downward extension of the stanchions to form the floor 72 for the engine 71 is to operate as a pendulum to maintain the vertical disposition of the cradle. At the rear of the engine room thus formed the framing supports not only the shaft 105 but the shafting and conveyers forming a part of the delivery system with which the machine is provided.

*Loading and unloading mechanism.*—As previously explained, the impounded fish are delivered by the scoop upon the belt 49 of the boom, and the belt 49 delivers to the belt 58, which in turn delivers to the chute 62. As shown in Fig. 7 of the drawings the chute 62 is provided with a series of perforations 114, 114. The perforations 114 are sufficiently large to pass particles of refuse or other material carried over the belts 47 and 58, which are thus eliminated from the desired product of the machine. While I have herein shown a certain style and a single sorting chute 62, it will be understood that I may, without passing beyond the scope of the present invention, multiply the number of chutes and vary the perforations 114. In the present showing, as seen best in Fig. 15 of the drawings, the refuse is dropped between the inclined fenders 115, 115, the lower ends whereof are converged toward each other to guide the said refuse upon the one or other of the conveyer belts 116, 116. The belts 116, 116 are operated in the direction shown by the arrows, and the belt which at any time is selected for the conveyance of the refuse is selected by the apron such as shown in the said figure of the drawings as applied to the conveyers 117, 117, and wherein is shown a draper pan 118 removably placed between the side rails of the two conveyers 117 to incline, as shown in said Fig. 15, toward the one conveyer 117.

In the present drawings no particular receptacle is shown as provided for the storage of the refuse. This may, however, be done by bulkheading off any one or more of the bins hereinafter described, preferably as indicated by the fact that I divide the belts 116 to deliver alternately to the hulls 22, 22 and to the main conveyers 119, 119 therein provided.

From the chute 62 the fish and other articles to be preserved are delivered to a tail pan 120. The pan 120 is converged to deposit upon the draper pan 118, which, as above stated, may be disposed to incline for delivery to either of the conveyers 117, 117. The product is delivered by the conveyers 117, 117 to the main conveyers 119, 119. The conveyers 119 are disposed lengthwise of the hulls 22, 22 and in the upper section of the bins 81 formed therein.

The conveyers 119, 119 are provided with suitable belts which are threaded between superposed rollers 121, 121 mounted in an automatic distributing loader, as hereinafter described. The loader operates to deliver the product to the bins 81 and to distribute the same evenly from the forward to the rear end thereof.

The bins 81 are provided with door openings 122, 122 between the hopper sides 123, 123 forming the lower section of the bins. The door openings 122, 122 are closed by suitable slides 124, 124, said slides being provided each with a handle 125, as seen best in Fig. 12 of the drawings. Directly beneath each series of door openings 122 is disposed an endless belt conveyer 126. The conveyers 126 are provided to unload the vessel and the hulls 22, 22 thereof.

The conveyers 126, as stated, are disposed in the lower sections of the bins 81, to deliver the product upon elevator conveyers 127, 127. The elevator conveyers 127 are mounted in suitable frames so that the upper ends thereof overhang the single transverse conveyer 128. The conveyer 128 is extended on a substantially level plane, and is disposed in front of the portholes 129, 129 in each of the hulls 22, 22.

The conveyers 130 are temporarily installed. When installed, they are mounted on the shafts 131ª, 131ª. The shafts 131ª are driven from the shafts 131, 131 through the transmission chains 131ᵇ, 131ᵇ. The shafts 131 are mounted at each side of the hull of the vessel and operate the conveyer 128, which is extended flatwise across the hull, the ends of which conveyer, in normal position, extend over the inner ends of the conveyers 130, when the latter are installed in operative position. In usual practice, the conveyer 130 is used at one side of the vessel only, being extended from one of the ports 129. To accommodate this arrangement, the conveyer 128 is driven to deliver its load at one or the other side of the vessel. For this reason, the shafts 131, 131 are each operatively connected by means of chains 133, 133, with sprockets 136, 136ª. The shafts 131 are provided with sprockets 132, 132, fixedly mounted each upon its respective shaft 131. The sprocket 136 is fixedly attached to the shaft 134, which is also provided, fixedly attached thereto, with a gear wheel 135. The shaft 134 is a countershaft, and driven only when the gear wheel 135 is in mesh with a gear wheel 137, which is slidably mounted on the shaft 105. The sprocket wheel 136ª is loosely mounted on the shaft 105, and is arranged to be clutch-engaged by any suitable construction, with the wheel 137, when the same is moved thereto. The disposition of the sprocket wheel 136ª and the gear wheel 135 is such that when the wheel 137 is moved to engage the one, it is moved out of engagement with the other. Thus, as seen in Fig. 16 of the drawings, if the wheel 137 be moved to engage the wheel 135, the chain 133, at the right of the drawing, will be driven to turn the shaft 131 clockwise, at the right of the drawing, causing the conveyer 128 to move on its upper extension, to deliver its load upon the conveyer 130, shown as installed (see the fragment of the conveyer 130 at the right of Fig. 16). If the conveyer 130 be now shifted and be mounted on the shaft 131ª, at the left of the drawing, Fig. 16, and the gear wheel 137 be moved out of engagement with the wheel 135 and into engagement with the sprocket 105, the chain 133 at the left of the drawing and the shaft 131 on the same side of the drawing, will be driven to rotate the said shaft the reverse of clockwise, and to move the conveyer 128 to the left of the drawing, Fig. 16. During the period when the shaft 105 is being driven, and the conveyers 128 and 130 are not employed, the gear wheel 137 is moved out of engagement with both of the sprockets 136ª and the gear wheel 135.

When in the course of operation it becomes desirable to deliver the product direct from the conveyer belt 49 and device attached thereto without first depositing the product in the bins, one or more chutes 138 are employed. The chutes 138 are extended through portholes 138ª suitably located in the side of the bins, and are extended outward therefrom for delivery to tenders brought alongside the vessel and there held. When it is desired to deliver the product to a tender following the vessel the conveyer 139 is employed. The conveyer 139 is pivoted on a shaft 140, as shown best in Fig. 11 of the drawings. When this conveyer is employed a temporary bridge conveyer 141 is mounted between the chute 62 and the conveyer 139, being supported by shafts 142 and 143. The chute 62 now delivers direct to the conveyer 141, and the conveyer 141 delivers to the conveyer 139, the outer end whereof is disposed in delivering relation to the tender following.

It will be understood that the conveyer belts and mountings therefor may be of any well known approved design. At present I prefer to use an open mesh belt, but I reserve the privilege of changing the construction of the belting to suit the needs of various operations to which this machine may be adapted. In the drawings the direction of movement of the belts is indicated by arrows.

*Loader.*—There has been above mentioned the distributing loaders with which this machine is provided. A view of one of the loaders is best shown in Fig. 14 of the drawings. The loaders consist primarily of a traveling frame having side runners 144, 144, for the travel of which tracks 145, 145 are provided. Intermediate the runners 144, 144 is a guide board 148. Extended between the runners 144 and the guide board 148 is a cross brace 146. Extended between the guide board 148 and one of the runners 144 is a push board 147. The push board 147 is extended downward from the frame into the body of the bin. The lower end of the push board 147 is provided with an inclined surface 149 disposed to receive the weight and pressure of the load deposited in the bin in front of the said push board. The shape of the push board at its lower extension may conform to the transverse shape of the bin. Journaled in one of the runners 144 and in the adjacent guide board 148 are the rollers 121, 121, arranged substantially as shown in Fig. 14 of the drawings. The superposed arrangement of the rollers forms a dumping section for the upper reach of the main conveyer belts 119. If it is desired to emphasize this feature the upper of the rollers 121 is advanced in front of the lower of the said rollers 121. It is to deliver the load carried by the belt 119 laterally therefrom that I have provided a short chute 150. The chute 150 is extended through a gate provided for that purpose in the guide board 148. With this arrangement it is evident that the loader will remain constant in any position of the tracks 145, the belt of the conveyer 119 running constantly therethrough over the rollers 121, 121. When the loaders are initially located the load is first deposited by the chute 150, being transferred laterally from the belt of the conveyer 119 into the bin below the said conveyer. When in the course of operation the section in advance of the loader becomes filled, the weight of the load rests upon the inclined surface 149 and moves the loader away from the filled section, being moved to do so by the weight of the load. It is obvious that as the operation of the conveyer 119 is continuous the retreat of the loaders from the conveyer delivery end of the conveyer is continuous and proportionate to the load as delivered in front of the push board 147. In this manner the bins 31, 31 are each alternately or simultaneously loaded, and the load is evenly distributed therein. It will be understood that at the beginning of the operation of filling the bins 31, 31 the loaders are moved to the bow end of the said bins.

In the full operation of the invention the machine is designed as a temporary receptacle for the material being harvested, the said material being transferred from the machine to tenders or transfer vessels. It is to provide for the proper arrangement of these that I employ the laterally extended booms 151, 151 and the tail booms 152, 152. These booms, as shown in the drawings, are of greater length than ordinarily provided, being intended to hold the attendant vessel under severe stress of weather. The forward booms whereby the vessel will be drawn are reinforced by guys 153, 153. The booms, when not in use, are lifted vertically by cables 154, 154.

*The scoop guiding mechanism.*—As shown best in Fig. 3 of the drawings, the rear wheels 91, 91 are provided with steering mechanism for guiding the scoop. The wheels are preferably pivoted and are provided with arms 155 which are each connected to cables 156, 156. The cables 156, 156 are reeved over guide pulleys 157, and extended upward under the rails 47, 47 of the boom and carried to the pilot house 30 to be there operated to guide the scoop in a measure independent of the track of the vessel. In certain instances, as for instance, where the water is shallow, and where a large scoop is employed, propelled by a somewhat undersized or shallow draft vessel, the vessel, as well as the scoop, is guided or steered by controlling the steering wheels 91 of the scoop frame.

*The operation.*—When a machine constructed and arranged in accordance with the present invention, and as shown in the accompanying drawings, is moved to the field of operation, the boom mounted on the rails 47, 47, and the scoop attached thereto, are lifted in horizontal position, as shown in Figs. 8, 9 and 10 of the drawings. In this position the machine is operated as any ordinary boat. Having arrived at the field of operation the cable 74 is released, and the boom and tool connected therewith will become thereby partially submerged. The machine is then propelled ahead, when the water pressure being exerted upon the hood 73 of the boom will sink the said boom until the tool mounted thereon rests lightly but firmly upon the prepared bed or sea bottom. In this position the fish or other floating bodies are impounded between the wide opened end of the scoop shown in the accompanying drawings, and are, by the current created, delivered upon the belt 49 of the boom. The engine 71 having been started, and the belt 49 running, the fish and floating articles are carried by the belt to be delivered for sorting, separation and distribution in the manner as above described. When the operation having been finished, the machine is prepared for return, the cable 74 is hauled upon to lift the boom and tool connected therewith. It will be understood that at all times the weights 81 may be varied to increase or diminish the pressure on the boom and the tool connected therewith. It will be remembered that while the tool is resting on the bottom or bed the vessel is permitted to rock without changing the vertical disposition of the boom or the operative position of the tool. When, however, on return of the vessel the boom and tool connected therewith are lifted, the same are drawn toward the straight sides of the knees 35, 35 to be thereby imprisoned and made fast, so that in the subsequent pitching or rolling of the vessel the boom and parts connected therewith will not have a movement separate from the vessel. In this manner the boom and tool are completely and automatically stowed.

Having thus described my invention, what I claim as new and desire to secure by Letters Patent is:—

1. In a submarine cultivator and harvester, a submarine tool having a lateral extension adapted to travel on the sea bottom; a floating vessel; a cradle mounted on said vessel from which said tool is operated; a boom pivotally connected with said cradle and said tool; a conveyer mounted on said boom; and a cover for said conveyer mounted on said boom to receive water pressure for depressing the tool bearing end thereof, when the device moves forward.

2. In a submarine cultivator and harvester, embodying a floating hull, a submarine tool, a boom connecting said hull and said tool, and a conveyer mounted on said boom; a cradle pivotally mounted on said hull to support the one end of said boom; and a ballast carried by said cradle adapted to maintain the normal vertical disposition thereof.

3. In a submarine cultivator and harvester, a rocking cradle mounted on pivots disposed in line with the operating direction of said cultivator, said pivots being disposed above the median line of said cradle, and said cradle being further provided with a deck below said pivotal center to receive a ballast to maintain said section in constant vertical disposition; and a conveyer boom pivotally connected with said cradle to extend toward the sea bottom, forward of said cradle.

4. In a submarine cultivator and harvester, a cradle mounted on pivots disposed in line with the operating direction of said cultivator, said pivots being disposed above the median line of said cradle, and said cradle being further provided with a deck below said pivotal center to receive a ballast to maintain said cradle in constant vertical disposition; a boom embodying an elevating conveyer and a gathering tool adapted to gather and deposit the product on said conveyer, said boom being attached to said cradle by pivots disposed transverse said cradle; and a system of conveyers mounted in said cradle arranged to receive from the conveyer on said boom and to distribute therefrom the product elevated thereby.

5. In a submarine cultivator and harvester, a fishing tool having an open front forwardly spread rearwardly contracted frame; an open mesh covering for the top and sides thereof; a wheel carried frame the wheels whereof being adapted to travel on the sea bottom to support the same; auxiliary rollers disposed transverse said contracted frame between said wheels to support said contracted frame intermediate said wheels; a boom pivotally connected to said wheel-carried frame and extended above the surface of the water; and a conveyer mounted on said boom to receive the catch of said contracted frame.

6. In a submarine cultivator and harvester, a fishing tool having an open front forwardly spread rearwardly contracted frame; an open mesh covering for the top and sides thereof; a wheel carried frame the wheels whereof being adapted to travel on the sea bottom to support said contracted frame; a sliding bottom for said contracted frame adapted to support the same on sea beds sufficiently soft to sink said wheels; a boom pivotally connected to said wheel-carried frame and extended above the surface of the water; and a conveyer mounted on said boom to receive the catch of said contracted frame.

7. In a submarine cultivator and harvester, a fishing tool having an open front forwardly spread rearwardly contracted frame; an open mesh covering for the top and sides thereof; a wheel carried frame the wheels whereof being adapted to travel on the sea bottom to support the same; auxiliary rollers disposed transverse said contracted frame between said wheels to support the same intermediate said wheels; a sliding bottom for said contracted frame adapted to support the same on sea beds sufficiently soft to sink said wheels; a boom pivotally connected to said wheel-carried frame and extended above the surface of the water; and a conveyer mounted on said boom to receive the catch of said contracted frame.

In testimony whereof I have signed my name to this specification in the presence of two subscribing witnesses.

NELS A. LYBECK.

Witnesses:
  E. F. MURDOCK,
  PHILIP D. ROLLHAUS.